United States Patent
Tseng et al.

(10) Patent No.: US 9,143,421 B2
(45) Date of Patent: Sep. 22, 2015

(54) NETWORK SYSTEM CAPABLE OF IMPLEMENTING STUN WITH THE ASSISTANCE OF TWO NETWORK DEVICES AND METHOD THEREOF

(71) Applicant: D-Link Corporation, Taipei (TW)

(72) Inventors: Chien-Chao Tseng, Hsinchu (TW); Chia-Liang Lin, Pingtung (TW)

(73) Assignee: D-LINK CORPORATION, Taipei (TW)

( * ) Notice: Subject to any disclaimer, the term of this patent is extended or adjusted under 35 U.S.C. 154(b) by 312 days.

(21) Appl. No.: 13/906,600

(22) Filed: May 31, 2013

(65) Prior Publication Data

US 2014/0310397 A1    Oct. 16, 2014

(30) Foreign Application Priority Data

Apr. 10, 2013   (TW) .............................. 102112655 A

(51) Int. Cl.
*G06F 15/16* (2006.01)
*H04L 12/26* (2006.01)
*H04L 29/12* (2006.01)

(52) U.S. Cl.
CPC ................ *H04L 43/10* (2013.01); *H04L 61/25* (2013.01); *H04L 61/251* (2013.01); *H04L 61/256* (2013.01); *H04L 61/2507* (2013.01); *H04L 61/2575* (2013.01); *H04L 61/2514* (2013.01)

(58) Field of Classification Search
CPC ... H04L 61/25; H04L 61/256; H04L 61/2514; H04L 61/2507; H04L 61/251; H04L 61/2575; H04L 29/125; H04L 29/12528; H04L 29/12509; H04L 65/1073; H04L 69/163; H04W 36/00
See application file for complete search history.

(56) References Cited

U.S. PATENT DOCUMENTS

| | | | |
|---|---|---|---|
| 8,065,418 B1* | 11/2011 | Abuan et al. ................... | 709/227 |
| 8,228,861 B1* | 7/2012 | Nix ................ | 370/329 |
| 2008/0201480 A1* | 8/2008 | He et al. ........................ | 709/227 |
| 2009/0138611 A1* | 5/2009 | Miao et al. .................... | 709/228 |
| 2009/0228593 A1* | 9/2009 | Takeda ........................... | 709/227 |
| 2010/0040057 A1* | 2/2010 | Ko ................ | 370/392 |
| 2010/0312880 A1* | 12/2010 | Veits ............................. | 709/224 |
| 2011/0252079 A1* | 10/2011 | Werner et al. .................. | 709/202 |
| 2013/0117437 A1* | 5/2013 | Tseng et al. ................... | 709/224 |

* cited by examiner

*Primary Examiner* — Le H Luu
(74) *Attorney, Agent, or Firm* — Bacon & Thomas, PLLC

(57) ABSTRACT

The present invention is to provide a network system, which comprises a coordinator server located in a public network; first and second NATs (Network Address Translators) located in first and second private networks and configured as a full-cone NAT, respectively; first and second network devices located in the first and second private networks and connected to the public network through the first and second NATs, respectively, wherein each of the first and second network devices has registered two mapped addresses with the coordinator server, respectively; a third NAT located in a third private network; and a third network device located in the third private network and connected to the public network through the third NAT, wherein the third network device can obtain the mapped addresses from the coordinator server and, based on the mapped addresses, conduct NAT behavior tests on the third NAT through the first and second network devices.

9 Claims, 5 Drawing Sheets

NETWORK SYSTEM CAPABLE OF IMPLEMENTING STUN WITH THE ASSISTANCE OF TWO NETWORK DEVICES AND METHOD THEREOF

FIELD OF THE INVENTION

The present invention relates to a network system, more particularly to a network system capable of implementing Session Traversal Utilities for Network Address Translation (STUN) with the assistance of two network devices, which comprises a coordinator server located in a public network; first and second Network Address Translators (NATs) located in first and second private networks and configured as a full-cone NAT, respectively; first and second network devices located in the first and second private networks and connected to the public network through the first and second NATs, respectively, wherein each of the first and second network devices has registered two mapped addresses with the coordinator server, respectively; a third NAT located in a third private network; and a third network device located in the third private network and connected to the public network through the third NAT, wherein the third network device can obtain the mapped addresses from the coordinator server and, based on the mapped addresses, conduct NAT behavior tests on the third NAT through the first and second network devices.

BACKGROUND OF THE INVENTION

With the development and advancement of communication technologies, network service applications have become a part of our daily lives. Peer-to-peer (hereinafter abbreviated as P2P) networking, for example, is a widely used technique nowadays whereby a user's network device (e.g., a desktop computer) can make direct connection with another user's network device through a P2P network to enable voice chat, video transmission, data sharing and exchange (e.g., pictures, music, and video recordings), distributed computation, or work in cooperation, to name only a few P2P applications.

In use, however, P2P networking is faced with problems associated with Network Address Translators (NATs). NATs are typically deployed at the border between a private network and a public network to carry out network address translation, which is an Internet standard defined in RFC 1631 and which mainly involves performing Internet Protocol (IP) address conversion on packets sent by network devices in a private network, so as for multiple network devices in a private network to make Internet connections using a common public IP address. More specifically, when an outgoing data packet of a private network reaches a NAT, the NAT converts the private IP address of the packet into a public IP address before sending the packet out. Likewise, when receiving an external packet, the NAT checks the public IP address of the packet against the information in a mapping table stored in the NAT, converts the public IP address into a private IP address according to the mapping table, and then forwards the packet to the corresponding network device in the private network.

As described above, NATs are configured to shield private networks by rendering the network devices behind a private NAT invisible to public networks. Hence, network devices which are respectively behind different private NATs cannot traverse the NATs to make direct connection with one another by P2P networking. To solve the NAT traversal problem, the User Datagram Protocol (UDP) hole punching technique was proposed, which works in the following manner. A network device behind a NAT begins by connecting with a server in a public network; consequently, the NAT establishes a mapping between the private IP address/port of the network device and a public IP address/port of the NAT and opens a port on the public interface of the NAT. Once the port is opened, network devices in the public network can transmit data through the port to the aforesaid network device behind the NAT. The effectiveness of UDP hole punching, however, is limited to a large extent by the mapping behavior and filtering behavior of the NAT. Besides, the port opened on the public interface of the NAT must be made known by the server in the public network. In order for UDP hole punching to work effectively, Session Traversal Utilities for Network Address Translation (or STUN for short) are called for.

STUN is a network protocol that enables a network device behind a NAT to find network information related to making connections, thus allowing two network devices respectively behind different NATs to connect to each other. The principle of STUN is briefly stated as follows. To start with, a network device behind a NAT sends a plurality of binding requests to a STUN server. Upon receiving each binding request, the STUN server sends out a binding response in reply, wherein the binding response includes the IP address and port number of the NAT as discovered by the STUN server. After receiving the binding responses, the network device behind the NAT can assess the mapping behavior and filtering behavior of the NAT and is notified of the port opened on the public interface of the NAT.

The STUN technique is described in more detail below. Generally, a STUN server with two public IP addresses is required for STUN detection, and a network device behind a NAT must transmit and receive plural UDP packets to and from the STUN server, wherein the UDP packets contain information that the network device needs to know, such as the IP address used by, and the port opened on, the public interface of the NAT. Using the information in the UDP packets, the network device can determine the type of the NAT behind which the network device is located. The foregoing process is now elaborated by means of an example based on the following assumptions: a network device Host A is located behind a NAT X, has the IP address IPa, and opens the port Pa1; and a STUN server is located in a public network and has two public IP addresses IPs1 and IPs2, wherein IPs1 opens two ports Ps11 and Ps12, and IPs2 opens one port Ps21. The network device Host A can obtain the mapped-address, and assess the mapping behavior and filtering behavior, of the NAT X by the following steps, in which the steps performed by the network device Host A to assess the mapping behavior of the NAT X are as follows:

(101) The network device Host A sends a first binding request through the port Pa1 with the IP address IPa to the public IP address IPs1 of the port Ps11 of the STUN server. After receiving the first binding request, the STUN server sends a first binding response through the port Ps11 with the public IP address IPs1 to the network device Host A in reply. The first binding response indicates the IP address of, and the port opened on, the public interface of the NAT X.

(102) Then, the network device Host A sends a second binding request through the port Pa1 with the IP address IPa to the public IP address IPs1 of the port Ps12 of the STUN server. After receiving the second binding request, the STUN server sends a second binding response through the port Ps12 with the public IP address IPs1 to the network device Host A in reply. The second binding response also indicates the IP address of, and the port opened on, the public interface of the NAT X.

(103) Next, the network device Host A sends a third binding request through the port Pa1 with the IP address IPa to the public IP address IPs2 of the port Ps21 of the STUN server. After receiving the third binding request, the STUN server sends a third binding response through the port Ps21 with the public IP address IPs2 to the network device Host A in reply. The third binding response, too, indicates the IP address of, and the port opened on, the public interface of the NAT X.

(104) Based on the binding responses received, the network device Host A determines whether the mapping behavior of the NAT X is independent, address-dependent, or address and port-dependent. More specifically, the mapping behavior of the NAT X is independent if the ports indicated in all the binding responses are the same, address-dependent if only the ports indicated in the first and the second binding responses are the same, or address and port-dependent if the ports indicated in the binding responses are all different.

The steps performed by the network device Host A to assess the filtering behavior of the NAT X are as follows:

(111) The network device Host A sends a first binding request through the port Pa1 with the IP address IPa to the public IP address IPs1 of the port Ps11 of the STUN server. After receiving the first binding request, the STUN server sends a first binding response through the port Ps11 with the public IP address IPs1 to the network device Host A in reply. The first binding response indicates the IP address of, and the port opened on, the public interface of the NAT X.

(112) Then, the network device Host A sends a second binding request through the port Pa1 with the IP address IPa to the public IP address IPs1 of the port Ps11 of the STUN server, wherein the second binding request has its CHANGE-REQUEST attribute set as "port". After receiving the second binding request, the STUN server sends a second binding response through the port Ps12 with the public IP address IPs1 to the network device Host A in reply. The second binding response also indicates the IP address of, and the port opened on, the public interface of the NAT X.

(113) Next, the network device Host A sends a third binding request through the port Pa1 with the IP address IPa to the public IP address IPs1 of the port Ps11 of the STUN server, wherein the third binding request has its CHANGE-REQUEST attribute set as "IP address". After receiving the third binding request, the STUN server sends a third binding response through the port Ps21 with the public IP address IPs2 to the network device Host A in reply. The third binding response indicates the IP address of, and the port opened on, the public interface of the NAT X, too.

(114) Based on the binding responses received, the network device Host A determines whether the filtering behavior of the NAT X is independent, address-dependent, or address and port-dependent. More specifically, the filtering behavior of the NAT X is independent if the network device Host A receives all the binding responses, address-dependent if the network device Host A receives only the first and the second binding responses, or address and port-dependent if the network device Host A receives only the first binding response.

It can be known from the above that a STUN server must interact with a network device behind a NAT many times in order for the network device to know the mapped address, mapping behavior, and filtering behavior of the NAT. Now that the prevalence of NATs must increase with the exhaustion of IPv4 addresses, more and more network devices will be located behind NATs and require the assistance of STUN servers in obtaining the mapped addresses, and assessing the mapping behaviors and filtering behaviors, of their respective NATs. Such a rising demand of assistance, however, will add greatly to the workload of STUN servers. Today, network service providers are endeavoring to find an effective solution to this problem, with a view to relieving the burden on STUN servers while allowing network devices to rapidly obtain information of their respective private NATs.

BRIEF SUMMARY OF THE INVENTION

In light of the expected surge of STUN server workload attributable to extensive use of NATs, the inventor of the present invention conducted extensive research and experiment and finally succeeded in developing a network system capable of implementing Session Traversal Utilities for Network Address Translation (STUN) with the assistance of two network devices and a method thereof. It is hoped that the workload of STUN servers can be substantially reduced with the advent of the present invention.

It is an object of the present invention to provide a network system capable of, and a method for, implementing Session Traversal Utilities for Network Address Translation (STUN) with the assistance of two network devices. The network system includes a coordinator server, a first Network Address Translator (NAT), a first network device, a second NAT, a second network device, a third NAT, and a third network device. The coordinator server is located in a public network. A first private network includes the first NAT and the first network device, wherein the first NAT is a full-cone NAT and the first network device is connected to the public network through the first NAT, can assist other network devices in obtaining NAT information, and has registered a first NAT mapped address and a second NAT mapped address with the coordinator server. A second private network includes the second NAT and the second network device, wherein the second NAT is also a full-cone NAT and the second network device is connected to the public network through the second NAT, can assist other network devices in obtaining NAT information, and has registered a third NAT mapped address and a fourth NAT mapped address with the coordinator server. A third private network includes the third NAT and the third network device, wherein the third network device is connected to the public network through the third NAT. The third network device can obtain the NAT mapped addresses from the coordinator server and, based on the NAT mapped addresses, conduct NAT behavior tests (e.g., a mapping behavior test and a filtering behavior test) on the third NAT in order to obtain the mapped address, and assess the NAT behaviors, of the third NAT. Thus, network devices in different private networks can implement STUN and successfully obtain information of their respective private NATs (e.g., information regarding the mapping behaviors and filtering behaviors of the NATs and the ports respectively opened by the NATs) through network devices already registered with the coordinator server, without having to conduct NAT behavior tests through a STUN server. Once such information is obtained, the aforesaid network devices in different private networks can establish connection paths between one another.

It is another object of the present invention to provide the foregoing network system and method, wherein the third network device, upon determining that the third NAT is a full-cone NAT, registers a fifth NAT mapped address and a sixth NAT mapped address with the coordinator server and is thus enabled to assist other network devices in implementing STUN. Consequently, the workload of STUN servers and of network devices configured for providing STUN services will be substantially reduced.

BRIEF DESCRIPTION OF THE SEVERAL VIEWS OF THE DRAWINGS

The technical features as well as further objects and effects of the present invention will be best understood by referring to the following detailed description of some illustrative embodiments in conjunction with the accompanying drawings, in which.

DETAILED DESCRIPTION OF THE INVENTION

Figure 1:
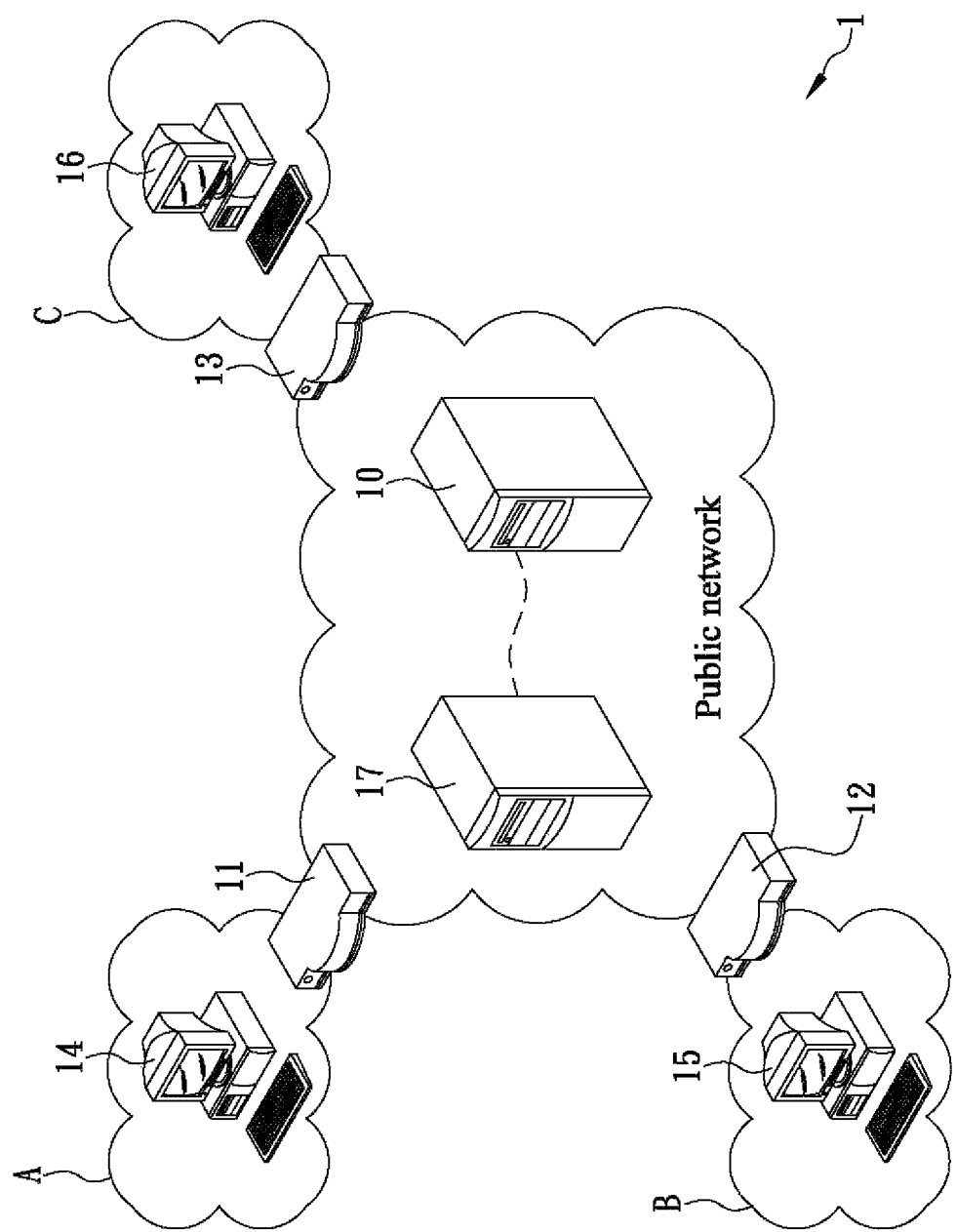
FIG. 1 is the structural diagram of a network system according to the present invention.

The present invention discloses a network system capable of implementing Session Traversal Utilities for Network Address Translation (STUN) with the assistance of two network devices and a method thereof. In one embodiment, referring to FIG. 1, the network system 1 includes a coordinator server 10, a first Network Address Translator (NAT) 11, a second NAT 12, a third NAT 13, a first network device 14, a second network device 15, and a third network device 16. The coordinator server 10 is located in a public network and may be a tracker or coordinator configured for tracking connections between nodes. The first NAT 11 and the first network device 14 are located in a first private network A. The first NAT 11 is a full-cone NAT, meaning the mapping behavior and filtering behavior of the first NAT 11 are both independent. The first network device 14 is connected to the public network through the first NAT 11, can assist other network devices in obtaining NAT information, and has registered a first mapped address and a second mapped address with the coordinator server 10.

As shown in FIG. 1, the second NAT 12 and the second network device 15 are located in a second private network B. The second network device 15 is connected to the public network through the second NAT 12, can assist other network devices in obtaining NAT information, and has registered a third mapped address and a fourth mapped address with the coordinator server 10. The third NAT 13 and the third network device 16 are located in a third private network C. The third network device 16, which is connected to the public network through the third NAT 13, can obtain the first to the fourth mapped addresses from the coordinator server 10 and conduct NAT behavior tests (e.g., a mapping behavior test and a filtering behavior test) on the third NAT 13 according to the mapped addresses obtained, thereby obtaining the mapped address of the third NAT 13 and assessing the NAT behaviors of the third NAT 13. In other words, the third network device 16 can implement STUN and successfully obtain information of the third NAT 13 behind which the third network device 16 is located (e.g., information regarding the mapping behavior and filtering behavior of the third NAT 13 and the port opened by the third NAT 13), without having to conduct the NAT behavior tests through the STUN server 17. Now that the three network devices in different private networks can establish connection paths between one another without the assistance of the STUN server 17 in conducting the NAT behavior tests, the workload of the STUN server 17 is considerably reduced.

A more specific disclosure of the aforesaid technical features is provided below, starting with a detailed description of how to determine whether the first network device 14 and the second network device 15 are capable of assisting other network devices in obtaining NAT information. Referring to FIG. 1, the first network device 14 has the IP address IPa and opens two ports Pa1 and Pa2. The second network device 15 has the IP address IPb and opens two ports Pb1 and Pb2. The network interface of the STUN server 17 has two public IP addresses IPs1 and IPs2. The public IP address IPs1 opens two sockets which use the ports Ps11 and Ps12 respectively, and the public IP address IPs2 opens a single socket which uses the port Ps21. The coordinator server 10 has the public IP address IPt, which opens a socket using the port Pt. The first network device 14 and the second network device 15 can send requests from their respective IP addresses IPa and IPb to the public IP address IPt of the coordinator server 10 in order to obtain the public IP addresses IPs1, IPs2 and the ports Ps11, Ps12, Ps21 required for the STUN server 17 to provide STUN services. For the sake of simplicity in description, a request sent out through the port Pa1 with the IP address IPa will be hereinafter referred to as sent from the transmission address IPa.Pa1, wherein the transmission address is a contracted form of the IP address and the corresponding port.

Figure 2:
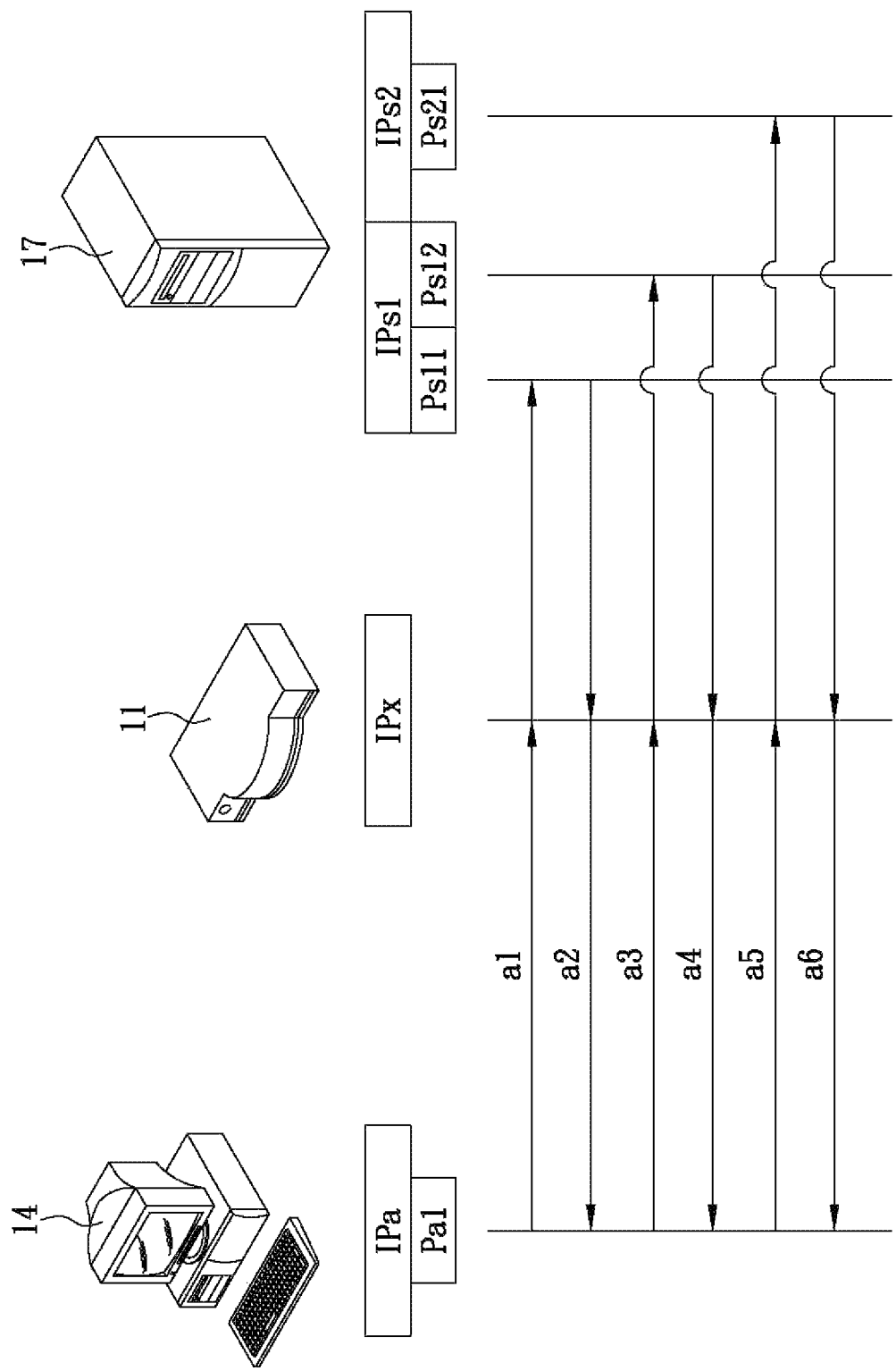
FIG. 2 is a time sequence diagram showing how a first network device and a second network device conduct a mapping behavior test.

Referring to FIG. 1, after obtaining the public IP addresses IPs1, IPs2 and the ports Ps11, Ps12, Ps21 of the STUN server 17, the first network device 14 and the second network device 15 communicate with the STUN server 17 respectively to obtain information related to the first and the second NATs 11, 12 (e.g., their public IP addresses, the ports opened, and information regarding their mapping behaviors and filtering behaviors respectively). As the processes by which the first network device 14 and the second network device 15 conduct NAT behavior tests respectively are identical, the following description is directed only to the NAT behavior test conducted by the first network device 14. To begin with, referring to FIG. 2, the steps of the mapping behavior test are detailed below:

(201) The first network device 14 sends a first binding request from the transmission address IPa.Pa1 through the first NAT 11 to the transmission address IPs1.Ps11 of the STUN server 17 (as indicated by a1 in FIG. 2).

(202) The STUN server 17 receives the first binding request and replies by sending a first binding response from the transmission address IPs1.Ps11 to the first network device 14 (as indicated by a2 in FIG. 2), wherein the first binding response indicates the public IP address of, and the port opened by, the first NAT 11.

(203) Next, the first network device 14 sends a second binding request from the transmission address IPa.Pa1 through the first NAT 11 to the transmission address IPs1.Ps12 of the STUN server 17 (as indicated by a3 in FIG. 2).

(204) The STUN server 17 receives the second binding request and replies by sending a second binding response from the transmission address IPs1.Ps12 to the first network device 14 (as indicated by a4 in FIG. 2), wherein the second binding response also indicates the public IP address of, and the port opened by, the first NAT 11.

(205) Then, the first network device 14 sends a third binding request from the transmission address IPa.Pa1 through the first NAT 11 to the transmission address IPs2.Ps21 of the STUN server 17 (as indicated by a5 in FIG. 2).

(206) The STUN server 17 receives the third binding request and replies by sending a third binding response from the transmission address IPs2.Ps21 to the first network device 14 (as indicated by a6 in FIG. 2), wherein the third binding response indicates the public IP address of, and the port opened by, the first NAT 11, too.

(207) After receiving all the aforesaid binding responses, the first network device 14 determines the mapping behavior of the first NAT 11 as independent if the ports indicated in all the binding responses are the same, as address-dependent if only the ports indicated in the first and the second binding responses are the same, or as address and port-dependent if the ports indicated in the binding responses are all different.

Figure 3:
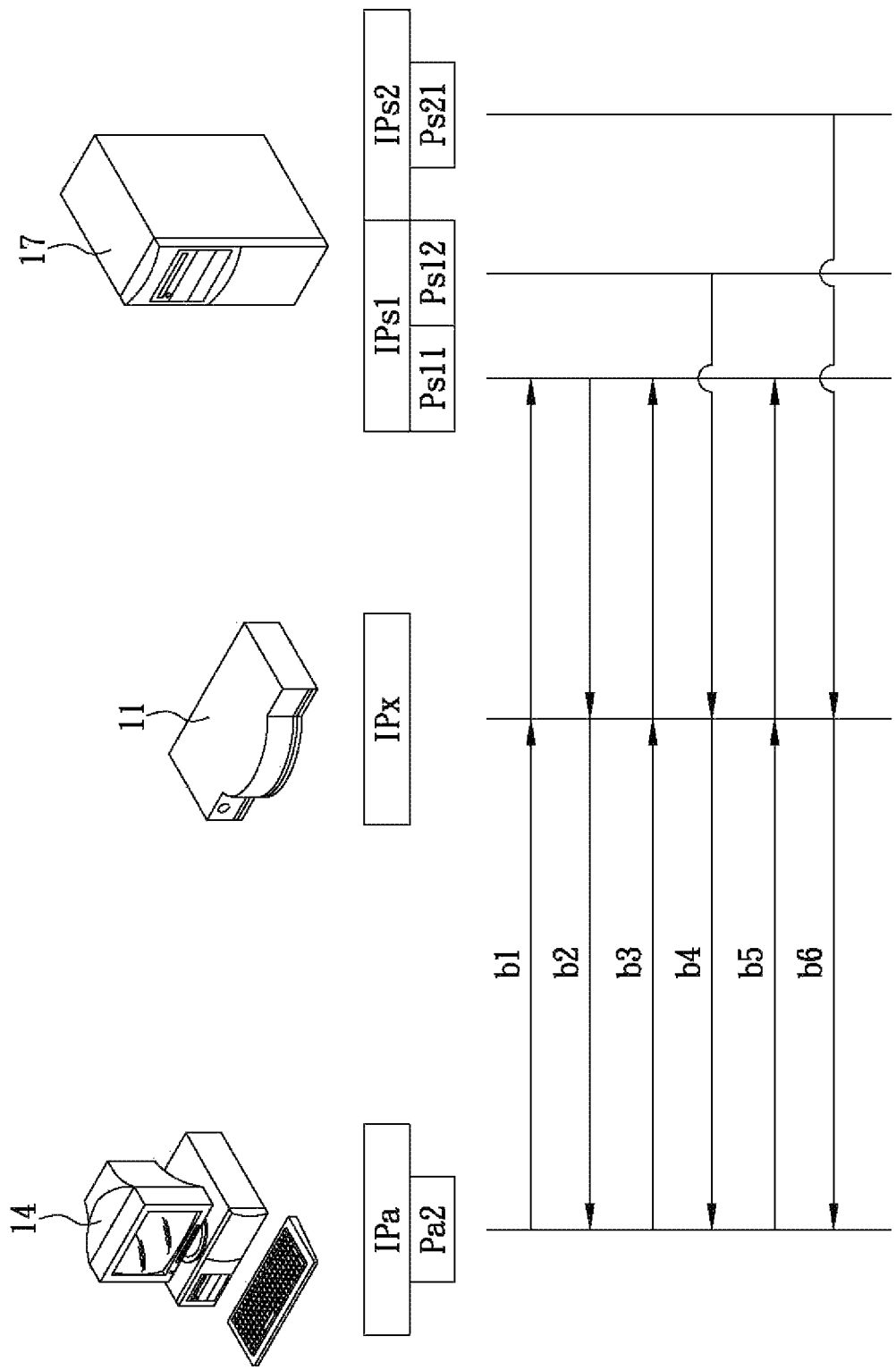
FIG. 3 is a time sequence diagram showing how the first network device and the second network device conduct a filtering behavior test.

Referring to FIG. 3 in conjunction with FIG. 1, the filtering behavior test is carried out as follows:

(211) The first network device 14 sends a fourth binding request from the transmission address IPa.Pa2 through the first NAT 11 to the transmission address IPs1.Ps11 of the STUN server 17 (as indicated by b1 in FIG. 3).

(212) The STUN server 17 receives the fourth binding request and replies by sending a fourth binding response from the transmission address IPs1.Ps11 to the first network device 14 (as indicated by b2 in FIG. 3), wherein the fourth binding response indicates the public IP address of, and the port opened by, the first NAT 11.

(213). Then, the first network device 14 sends a fifth binding request from the transmission address IPa.Pa2 through the first NAT 11 to the transmission address IPs1.Ps11 of the STUN server 17 (as indicated by b3 in FIG. 3), wherein the fifth binding request has the "change port" flag in its CHANGE-REQUEST attribute set at 1.

(214) The STUN server 17 receives the fifth binding request and replies by sending a fifth binding response from the transmission address IPs1.Ps12 to the first network device 14 (as indicated by b4 in FIG. 3), wherein the fifth binding response also indicates the public IP address of, and the port opened by, the first NAT 11.

(215) Following that, the first network device 14 sends a sixth binding request from the transmission address IPa.Pa2 through the first NAT 11 to the transmission address IPs1.Ps11 of the STUN server 17 (as indicated by b5 in FIG. 3), wherein the sixth binding request has the "change IP" flag in its CHANGE-REQUEST attribute set at 1.

(216) The STUN server 17 receives the sixth binding request and replies by sending a sixth binding response from the transmission address IPs2.Ps21 to the first network device 14 (as indicated by b6 in FIG. 3), wherein the sixth binding response indicates the public IP address of, and the port opened by, the first NAT 11, too.

(217) If the first network device 14 receives all the fourth, fifth, and sixth binding responses, the first network device 14 determines the filtering behavior of the first NAT 11 as independent. If only the fourth and the fifth binding responses are received, the filtering behavior of the first NAT 11 is determined as address-dependent. If only the fourth binding response is received, the filtering behavior of the first NAT 11 is determined as address and port-dependent.

Referring back to FIG. 1, if the mapping behavior and filtering behavior of the first NAT 11 and of the second NAT 12 are all independent, both the first NAT 11 and the second NAT 12 are full-cone NATs, meaning the network devices 14, 15 located respectively behind the NATs 11, 12 are capable of assisting other network devices in obtaining NAT information. In that case, the first network device 14 can register a first mapped address IPx.Px1 and a second mapped address IPx.Px2 with the coordinator server 10, wherein the first mapped address IPx.Px1 corresponds to the transmission address IPa.Pa1 of the first network device 14 and the second mapped address IPx.Px2 corresponds to the transmission address IPa.Pa2 of the first network device 14. Also, the second network device 15 can register a third mapped address IPy.Py1 and a fourth mapped address IPy.Py2 with the coordinator server 10, wherein the third mapped address IPy.Py1 corresponds to the transmission address IPb.Pb1 of the second network device 15 and the fourth mapped address IPy.Py2 corresponds to the transmission address IPb.Pb2 of the second network device 15 IPb.Pb2.

Referring again to FIG. 1, if more than two network devices capable of assisting other network devices in obtaining NAT information are registered with the coordinator server 10, the coordinator server 10 will choose two of the network devices and notify the two network devices to provide STUN services in concert (i.e., to provide assistance to other network devices in obtaining NAT information). The notification process of the coordinator server 10 is as follows:

(221) The coordinator server 10 sends an organization message to each of the first mapped address IPx.Px1 of the first NAT 11 and the third mapped address IPy.Py1 of the second NAT 12.

(222) The first NAT 11 forwards the organization message to the transmission address IPa.Pa1 of the first network device 14, wherein the organization message informs the first network device 14 that it is required to provide STUN services in conjunction with the second network device 15. Similarly, the second NAT 12 forwards the organization message to the transmission address IPb.Pb1 of the second network device 15, wherein the organization message informs the second network device 15 that it is required to provide STUN services in conjunction with the first network device 14.

(223) Then, the first network device 14 sends an organization confirmation request to the third mapped address IPy.Py1 of the second NAT 12, and the organization confirmation request is forwarded by the second NAT 12 to the transmission address IPb.Pb1 of the second network device 15. Upon receiving the organization confirmation request, the second network device 15 sends an organization confirmation reply to the first mapped address IPx.Px1 of the first NAT 11, and the organization confirmation reply is forwarded by the first NAT 11 to the transmission address IPa.Pa1 of the first network device 14.

(224) Similarly, the second network device 15 sends a second organization confirmation request to the first mapped address IPx.Px1 of the first NAT 11, and the second organization confirmation request is forwarded by the first NAT 11 to the transmission address IPa.Pa1 of the first network device 14. Upon receiving the second organization confirmation request, the first network device 14 sends a second organization confirmation reply to the third mapped address IPy.Py1 of the second NAT 12, and the second organization confirmation reply is forwarded by the second NAT 12 to the transmission address IPb.Pb1 of the second network device 15.

Hence, when another network device attempts to obtain NAT information of the private network where it is located, the first network device 14 and the second network device 15 will jointly provide STUN services to this network device.

Figure 4:
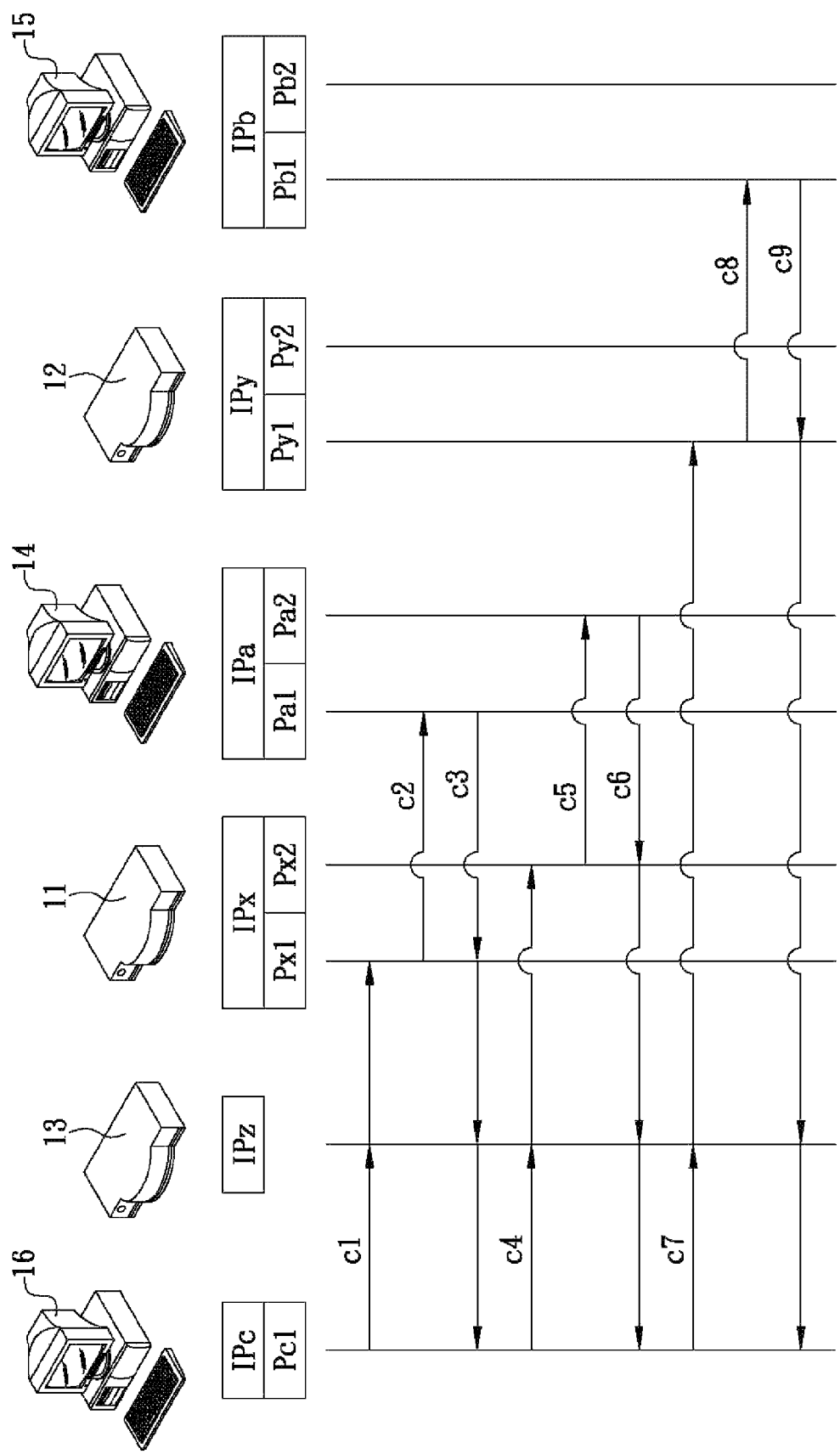
FIG. 4 is a time sequence diagram showing how a third network device conducts a mapping behavior test.

A detailed description of how the third network device 16 obtains NAT information of the third NAT 13 through the first and the second network devices 14, 15 is provided below with reference to FIG. 1. To begin with, the third network device 16, which has the IP address IPc and opens two ports Pc1 and Pc2, sends a request from the transmission address IPc.Pc1 to the transmission address IPt.Pt of the coordinator server 10 to obtain information related to the provision of STUN services (i.e., the mapped addresses IPx.Px1, IPx.Px2, IPy.Py1, and IPy.Py2 of the first and the second NATs 11, 12) and thereby enable conduction of subsequent NAT behavior tests. To carry out the mapping behavior test, referring to FIG. 4, the third network device 16 performs the following steps:

(301) The third network device 16 sends a seventh binding request from the transmission address IPc.Pc1 through the third NAT 13 to the first mapped address IPx.Px1 of the first NAT 11 (as indicated by c1 in FIG. 4).

(302) The first NAT 11 forwards the seventh binding request to the transmission address IPa.Pa1 of the first network device 14 (as indicated by c2 in FIG. 4).

(303) The first network device 14 receives the seventh binding request and sends a seventh binding response to the third network device 16 in reply (as indicated by c3 in FIG. 4), wherein the seventh binding response indicates the public IP address of, and the port opened by, the third NAT 13.

(304) Then, the third network device 16 sends an eighth binding request from the transmission address IPc.Pc1 through the third NAT 13 to the second mapped address IPx.Px2 of the first NAT 11 (as indicated by c4 in FIG. 4).

(305) The first NAT 11 forwards the eighth binding request to the transmission address IPa.Pa2 of the first network device 14 (as indicated by c5 in FIG. 4).

(306) The first network device 14 receives the eighth binding request and sends an eighth binding response to the third network device 16 in reply (as indicated by c6 in FIG. 4), wherein the eighth binding response also indicates the public IP address of, and the port opened by, the third NAT 13.

(307) Afterward, the third network device 16 sends a ninth binding request from the transmission address IPc.Pc1 through the third NAT 13 to the third mapped address IPy.Py1 of the second NAT 12 (as indicated by c7 in FIG. 4).

(308) The second NAT 12 forwards the ninth binding request to the transmission address IPb.Pb1 of the second network device 15 (as indicated by c8 in FIG. 4).

(309) The second network device 15 receives the ninth binding request and sends a ninth binding response to the third network device 16 in reply (as indicated by c9 in FIG. 4), wherein the ninth binding response indicates the public IP address of, and the port opened by, the third NAT 13, too.

(310) After receiving all the aforesaid binding responses, the third network device 16 determines the mapping behavior of the third NAT 13 as independent if the ports indicated in all the binding responses are the same, as address-dependent if only the ports indicated in the seventh and the eighth binding responses are the same, or as address and port-dependent if the ports indicated in the binding responses are all different.

Figure 5:
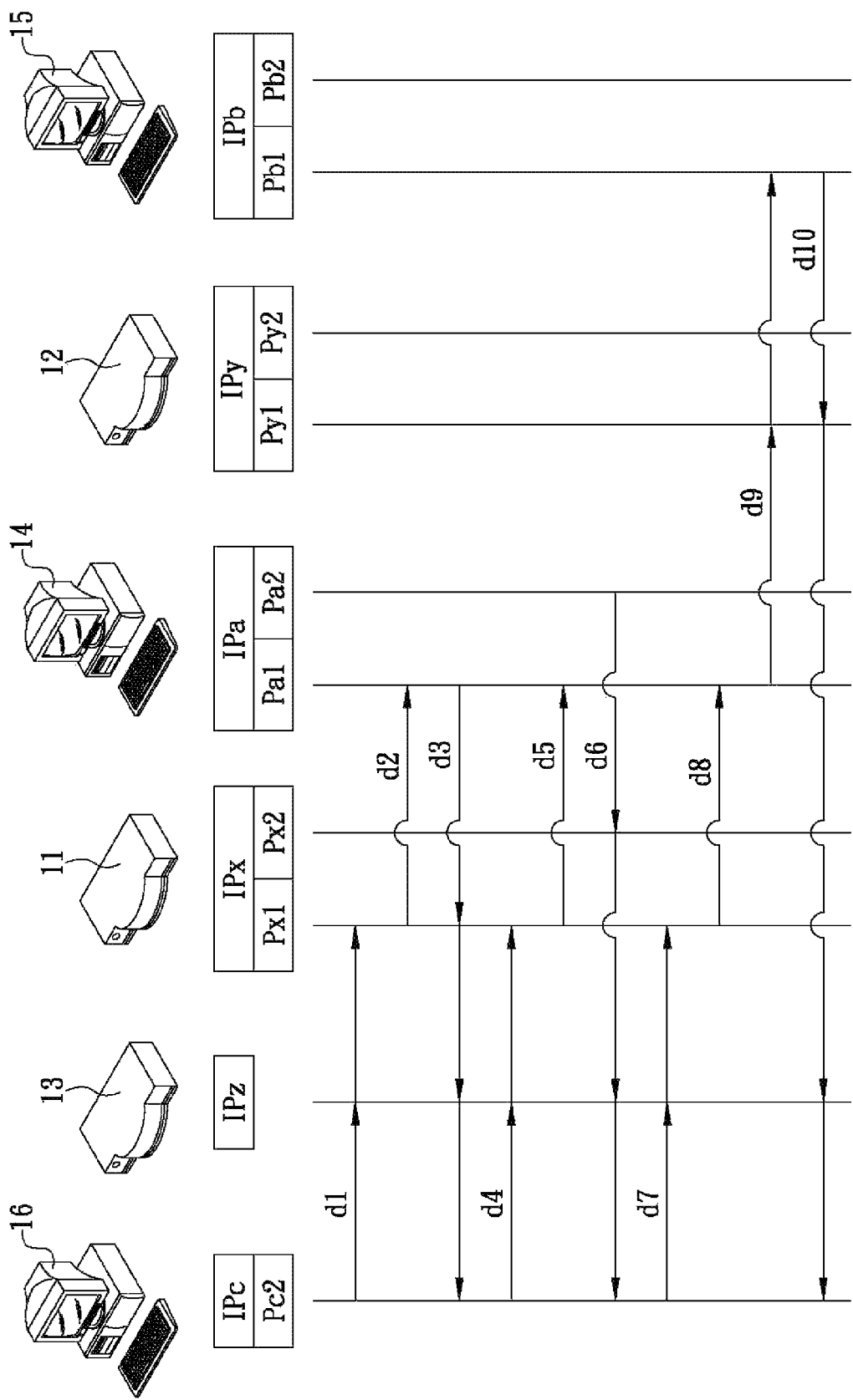
FIG. 5 is a time sequence diagram showing how the third network device conducts a filtering behavior test.

To conduct the filtering behavior test, referring to FIG. 5, the third network device 16 executes the following steps:

(321) The third network device 16 sends a tenth binding request from the transmission address IPc.Pc2 through the third NAT 13 to the first mapped address IPx.Px1 of the first NAT 11 (as indicated by d1 in FIG. 5).

(322) The first NAT 11 forwards the tenth binding request to the transmission address IPa.Pa1 of the first network device 14 (as indicated by d2 in FIG. 5).

(323) The first network device 14 receives the tenth binding request and sends a tenth binding response to the third network device 16 in reply (as indicated by d3 in FIG. 5), wherein the tenth binding response indicates the public IP address of, and the port opened by, the third NAT 13.

(324) Then, the third network device 16 sends an eleventh binding request from the transmission address IPc.Pc2 through the third NAT 13 to the first mapped address IPx.Px1 of the first NAT 11 (as indicated by d4 in FIG. 5), wherein the eleventh binding request has the "change port" flag in its CHANGE-REQUEST attribute set at 1.

(325) The first NAT 11 forwards the eleventh binding request to the transmission address IPa.Pa1 of the first network device 14 (as indicated by d5 in FIG. 5).

(326) The first network device 14 receives the eleventh binding request and replies by sending an eleventh binding response from the transmission address IPa.Pa2 to the third network device 16 (as indicated by d6 in FIG. 5), wherein the eleventh binding response also indicates the public IP address of, and the port opened by, the third NAT 13.

(327) Following that, the third network device 16 sends a twelfth binding request from the transmission address IPc.Pc2 through the third NAT 13 to the first mapped address IPx.Px1 of the first NAT 11 (as indicated by d7 in FIG. 5), wherein the twelfth binding request has the "change IP" flag in its CHANGE-REQUEST attribute set at 1.

(328) The first NAT 11 forwards the twelfth binding request to the transmission address IPa.Pa1 of the first network device 14 (as indicated by d8 in FIG. 5).

(329) The first network device 14 receives the twelfth binding request and then notifies the second network device 15 (as indicated by d9 in FIG. 5).

(330) The second network device 15 replies by sending a twelfth binding response from the transmission address IPb.Pb1 to the third network device 16 (as indicated by d10 in FIG. 5), wherein the twelfth binding response indicates the public IP address of, and the port opened by, the third NAT 13, too.

(331) If the third network device 16 receives all the tenth, eleventh, and twelfth binding responses, the third network device 16 determines the filtering behavior of the third NAT 13 as independent. If only the tenth and the eleventh binding responses are received, the filtering behavior of the third NAT 13 is determined as address-dependent. If only the tenth binding response is received, the filtering behavior of the third NAT 13 is determined as address and port-dependent.

According to the above, the third network device 16 no longer has to obtain NAT information of the third NAT 13 via the STUN server 17. Instead, the third network device 16 can obtain NAT information of the third NAT 13 through the STUN services provided by the first network device 14 and the second network device 15, thus significantly reducing the workload of the STUN server 17. Moreover, if the mapping behavior and filtering behavior of the third NAT 13 are both independent, meaning the third NAT 13 is a full-cone NAT, the third network device 16 can also assist other network devices in obtaining NAT information. In that case, the third network device 16 can register a fifth mapped address IPz.Pz1 and a sixth mapped address IPz.Pz2 with the coordinator server 10, wherein the fifth mapped address IPz.Pz1 corresponds to the transmission address IPc.Pc1 of the third network device 16 and the sixth mapped address IPz.Pz2 corresponds to the transmission address IPc.Pc2 of the third network device 16. Once the fifth and the sixth mapped addresses are registered, the third network device 16 is ready to assist another network device in obtaining NAT information of the private network where the latter network device is located.

While the invention herein disclosed has been described by means of specific embodiments, numerous modifications and variations could be made thereto by those skilled in the art without departing from the scope of the invention set forth in the claims.

What is claimed is:

1. A network system capable of implementing Session Traversal Utilities for Network Address Translation (STUN) with the assistance of two network devices, the network system comprising:
   a coordinator server located in a public network;
   a first Network Address Translator (NAT) located in a first private network and configured as a full-cone NAT;
   a first network device located in the first private network, connected to the public network through the first NAT, capable of assisting other network devices in obtaining NAT information, and having registered a first mapped address and a second mapped address with the coordinator server;
a second NAT located in a second private network and configured as a full-cone NAT;
a second network device located in the second private network, connected to the public network through the second NAT, capable of assisting other network devices in obtaining NAT information, and having registered a third mapped address and a fourth mapped address with the coordinator server;
a third NAT located in a third private network; and
a third network device located in the third private network and connected to the public network through the third NAT, wherein the third network device can obtain the mapped addresses from the coordinator server and, based on the mapped addresses, conduct NAT behavior tests on the third NAT through the first network device and the second network device.

2. The network system of claim 1, wherein upon determining that the third NAT is a full-cone NAT, the third network device registers a fifth mapped address and a sixth mapped address with the coordinator server.

3. A method for implementing Session Traversal Utilities for Network Address Translation (STUN) with the assistance of two network devices, the method being applicable to a network system comprising a coordinator server, a first Network Address Translator (NAT), a second NAT, a third NAT, a first network device, a second network device, and a third network device, wherein the coordinator server is located in a public network, the first NAT and the first network device are located in a first private network, the second NAT and the second network device are located in a second private network, and the third NAT and the third network device are located in a third private network, the first NAT and the second NAT being full-cone NATs, the first and the second network devices being connected to the public network through the first and the second NATs in the first and the second private networks respectively, the first network device being capable of assisting other network devices in obtaining NAT information and having registered a first mapped address and a second mapped address with the coordinator server, the second network device being capable of assisting other network devices in obtaining NAT information and having registered a third mapped address and a fourth mapped address with the coordinator server, the method comprising the steps of:
sending a request to the coordinator server by the third network device in order for the third network device to obtain the mapped addresses; and
conducting NAT behavior tests on the third NAT by the third network device through the first network device and the second network device in order for the third network device to obtain NAT information of the third NAT.

4. The method of claim 3, further comprising the step, to be performed by the third network device upon obtaining the NAT information of the third NAT and determining that the third NAT is a full-cone NAT, of:
registering a fifth mapped address and a sixth mapped address with the coordinator server.

5. The method of claim 4, wherein the network system further comprises a STUN server, and the method further comprises the steps, to be performed respectively by the first network device and the second network device in order to determine that the first NAT and the second NAT are full-cone NATs, of:

sending a request to the coordinator server in order for the first network device or the second network device to obtain a public Internet Protocol (IP) address and a port which are required for the STUN server to provide STUN services; and
communicating with the STUN server, conducting a mapping behavior test and a filtering behavior test, and determining that the first NAT or the second NAT is a full-cone NAT if both a mapping behavior and a filtering behavior of the first NAT or of the second NAT are independent.

6. The method of claim 4, further comprising the steps, to be performed in order for the coordinator server to notify the first network device and the second network device to jointly assist other network devices in obtaining NAT information, of:
sending an organization message to the first mapped address of the first NAT and to the third mapped address of the second NAT, by the coordinator server;
forwarding the organization message to the first network device by the first NAT, wherein the organization message informs the first network device that the first network device is required to work in conjunction with the second network device in order to assist other network devices in obtaining NAT information, and forwarding the organization message to the second network device by the second NAT, wherein the organization message informs the second network device that the second network device is required to work in conjunction with the first network device in order to assist other network devices in obtaining NAT information;
sending an organization confirmation request to the third mapped address of the second NAT by the first network device, forwarding the organization confirmation request to the second network device by the second NAT, sending an organization confirmation reply to the first mapped address of the first NAT by the second network device upon receiving the organization confirmation request, and forwarding the organization confirmation reply to the first network device by the first NAT; and
sending a second organization confirmation request to the first mapped address of the first NAT by the second network device, forwarding the second organization confirmation request to the first network device by the first NAT, sending a second organization confirmation reply to the third mapped address of the second NAT by the first network device upon receiving the second organization confirmation request, and forwarding the second organization confirmation reply to the second network device by the second NAT.

7. The method of claim 6, wherein the NAT behavior tests conducted by the third network device comprise a mapping behavior test and a filtering behavior test.

8. The method of claim 7, further comprising the steps, to be performed in order for the third network device to conduct the mapping behavior test, of:
sending a first binding request to the first mapped address of the first NAT by the third network device;
forwarding the first binding request to a first port of the first network device by the first NAT;
sending a first binding response to the third network device by the first network device upon receiving the first binding request, wherein the first binding response indicates a public Internet Protocol (IP) address and an opened port of the third NAT;
sending a second binding request to the second mapped address of the first NAT by the third network device;

forwarding the second binding request to a second port of the first network device by the first NAT;
sending a second binding response to the third network device by the first network device upon receiving the second binding request, wherein the second binding response indicates the public IP address and the opened port of the third NAT;
sending a third binding request to the third mapped address of the second NAT by the third network device;
forwarding the third binding request to a third port of the second network device by the second NAT;
sending a third binding response to the third network device by the second network device upon receiving the third binding request, wherein the third binding response indicates the public IP address and the opened port of the third NAT; and
determining, by the third network device upon receiving the first binding response, the second binding response, and the third binding response, a mapping behavior of the third NAT as independent if the ports indicated in all the binding responses are identical, as address-dependent if only the ports indicated in the first and the second binding responses are identical, or as address and port-dependent if the ports indicated in the binding responses are all different.

9. The method of claim 7, further comprising the steps, to be performed in order for the third network device to conduct the filtering behavior test, of:
sending a fourth binding request to the first mapped address of the first NAT by the third network device;
forwarding the fourth binding request to a first port of the first network device by the first NAT;
sending a fourth binding response to the third network device by the first network device from the first port thereof upon receiving the fourth binding request, wherein the fourth binding response indicates a public IP address and an opened port of the third NAT;
sending a fifth binding request to the first mapped address of the first NAT by the third network device, wherein a "change port" flag in a CHANGE-REQUEST attribute of the fifth binding request is set at 1;
forwarding the fifth binding request to the first port of the first network device by the first NAT;
sending a fifth binding response to the third network device by the first network device from a second port thereof upon receiving the fifth binding request, wherein the fifth binding response indicates the public IP address and the opened port of the third NAT;
sending a sixth binding request to the first mapped address of the first NAT by the third network device, wherein a "change IP" flag in a CHANGE-REQUEST attribute of the sixth binding request is set at 1;
forwarding the sixth binding request to the first port of the first network device by the first NAT;
notifying the second network device by the first network device upon receiving the sixth binding request;
sending a sixth binding response to the third network device by the second network device from a third port thereof, wherein the sixth binding response indicates the public IP address and the opened port of the third NAT; and
determining, by the third network device, a filtering behavior of the third NAT as independent if the third network device receives the fourth binding response, the fifth binding response, and the sixth binding response; as address-dependent if the third network device receives only the fourth binding response and the fifth binding responses; or as address and port-dependent if the third network device receives only the fourth binding response.

* * * * *